US007297922B2

(12) United States Patent
Giovannini et al.

(10) Patent No.: US 7,297,922 B2
(45) Date of Patent: Nov. 20, 2007

(54) OPTICAL RECEIVER PROTECTION CIRCUIT

(75) Inventors: Thomas J. Giovannini, San Jose, CA (US); Craig Schulz, Fremont, CA (US); Song Q. Shang, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 11/237,079

(22) Filed: Sep. 28, 2005

(65) Prior Publication Data

US 2007/0075215 A1    Apr. 5, 2007

(51) Int. Cl.
*H03G 3/20* (2006.01)
*H03F 3/08* (2006.01)
*H03K 5/19* (2006.01)
*H04B 10/06* (2006.01)

(52) U.S. Cl. .......................... 250/214 AG; 250/214 R; 327/20; 398/202

(58) Field of Classification Search ............. 250/214.1, 250/214 AG, 214 R, 214 A, 214 AL; 398/202, 398/206, 207, 209, 131; 327/20, 21, 252, 327/263, 308, 514
See application file for complete search history.

(56) References Cited

U.S. PATENT DOCUMENTS

| 6,122,084 | A * | 9/2000 | Britz et al. ............... 398/131 |
| 6,313,459 | B1 | 11/2001 | Hoffe et al. |
| 6,934,914 | B1 | 8/2005 | Vittal et al. |
| 2001/0019102 | A1 | 9/2001 | Chikuma |
| 2005/0001150 | A1 | 1/2005 | Yonemura |
| 2005/0205760 | A1 * | 9/2005 | Griffioen ............... 250/214.1 |

FOREIGN PATENT DOCUMENTS

| EP | 0 360 877 A1 | 4/1990 |
| WO | WO 98/00943 A1 | 1/1998 |
| WO | WO 2006/046013 A1 | 5/2006 |

OTHER PUBLICATIONS

Gordon, M. P. et al., "A microcontroller-based failsafe for single photon counting modules," *Review of Scientific Instruments*, vol. 74, No. 2, (Feb. 2003), pp. 1150-1152, American Institute of Physics.

(Continued)

*Primary Examiner*—Georgia Epps
*Assistant Examiner*—Don Williams
(74) *Attorney, Agent, or Firm*—Blakely, Sokoloff, Taylor & Zafman LLP

(57) ABSTRACT

An apparatus for optical receiver circuit protection includes a bias source, a bias monitor, and a comparator. The bias source is to provide a bias voltage to an optical receiver. The bias monitor is coupled to measure a current through the optical receiver, where the current changes responsive to received optical energy. A comparator is coupled to the bias monitor, where the comparator has a first state if the current is less than a threshold current level and where the comparator has a second state if the current is greater than the threshold current level. The bias source is coupled to be enabled responsive to the comparator switching to the first state and disabled responsive to the comparator switching to the second state.

17 Claims, 9 Drawing Sheets

OTHER PUBLICATIONS

Williams, Jim, "Bias-voltage and current-sense circuits make avalanche photodiodes work," *EDN*, (Mar. 6, 2003), pp. 83-102.

Analog Devices, Inc., "Avalanche Photodiode Bias Controller and Wide-range (5nA-5mA) Current Monitor," ADL5317 Preliminary Technical Data, Rev. PrE, (Feb. 27, 2005), pp. 1-11.

"Controller keeps watch over avalanche photodiodes," (Feb. 28, 2005), http://www.electronicstalk.com/news/anc/anc284.html, Pro-Talk Ltd, UK.

International Search Report for PCT/US2006/037575 (filed Sep. 26, 2006) mailed May 29, 2007 (6 pages).

Written Opinion of the International Search Authority for PCT/US2006/037575 (filed Sep. 26, 2006) mailed May 29, 2007 (14 pages).

\* cited by examiner

OPTICAL RECEIVER PROTECTION CIRCUIT

TECHNICAL FIELD

This disclosure relates generally to optical receiver circuits, and in particular but not exclusively, relates to protection of optical receivers during high levels of received optical power.

BACKGROUND INFORMATION

The ever-increasing requirements of today's optical-network systems require a sensitive device to accurately receive data and measure optical power. As the requirements for high data rates grow, more and more systems will transition to high-speed and high-sensitivity optical receivers. The designers of these optical-network systems have many types of optical receivers from which to choose. One such choice for a fast and highly sensitive optical receiver is an Avalanche Photo Diode ("APD").

APDs differ from other photodiodes in that APDs can provide gain, meaning that the ratio of incoming photons to outgoing electrons is greater than 1:1. This ratio, or avalanche multiplication factor, is controlled by a reverse bias voltage applied across the APD. APDs provide significant advantages over other types of optical receivers. Of particular note is that APDs exhibit low noise, broad spectral and frequency responses, and have high gain ranges provided by their internal photo-electronic signal gains.

The difficulty with using APDs is their high cost and their vulnerability to damage due to high-levels of received optical power. For example, APDs are often used in laser-based optical-fiber systems, such as wave division multiplexed ("WDM") networks. The Erbium-Doped Fiber Amplifier ("EDFA") is a device in the WDM network that boosts the signal in the optical fiber. However, the EDFA amplifies all channels in a WDM signal simultaneously, so as wavelength channels are added or dropped a high optical power spike can occur on one of the newly added or remaining channels. This high optical power spike causes a rapid increase in total current that flows through a biased APD and thereby may cause permanent damage to the device.

To maintain reliability of the optical network, the optical receiver should be able to continue to operate, without damage, after exposure to periods of high optical power. To operate continuously, rapid and effective safety mechanisms should be in place to detect such high optical power conditions and correspondingly protect the optical receiver.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for optical receiver protection during high levels of received optical power are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
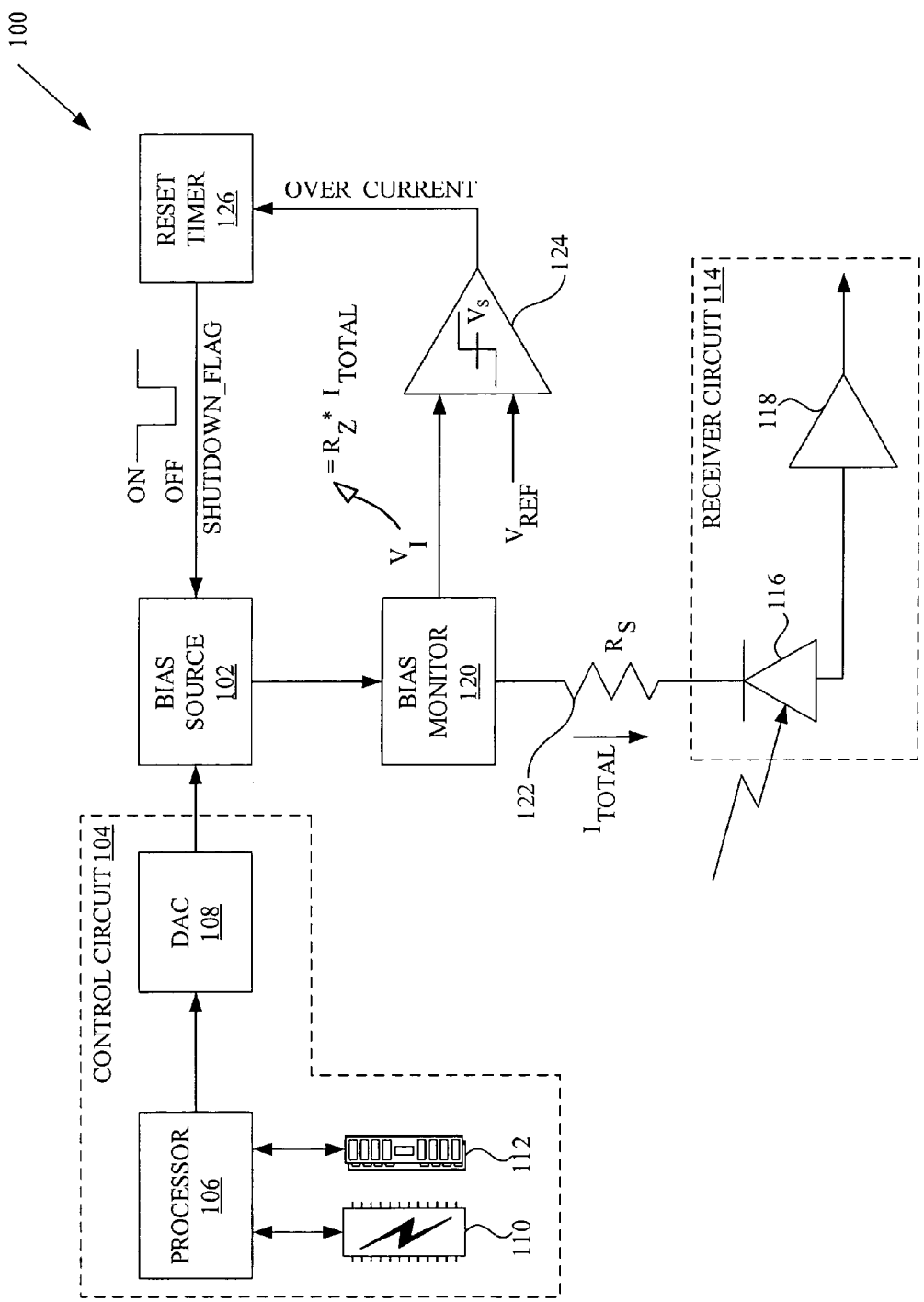
FIG. 1 is a functional block diagram illustrating an optical receiver protection circuit architecture with auto-shutdown of a bias voltage, in accordance with an embodiment of the invention.

FIG. 1 is a functional block diagram illustrating an optical receiver protection circuit architecture 100 with auto-shutdown of a bias voltage, in accordance with an embodiment of the invention. The illustrated embodiment of circuit architecture 100 includes a bias source 102, a control circuit 104, a receiver circuit 114, a bias monitor 120, a series resistor ("$R_S$") 122, a comparator 124, and a reset timer 126.

In the illustrated embodiment, bias source 102 is coupled to provide a bias voltage to an optical receiver 116. Control circuit 104 is coupled to control the voltage level of the bias voltage provided to optical receiver 116. The illustrated embodiment of control circuit 104 includes a processor 106, a digital-to-analog converter ("DAC") 108, a firmware unit 110, and a random access memory ("RAM") unit 112. Alternatively, control circuit 104 may include purely analog hardware to control the voltage level of the bias voltage. The voltage level set by control circuit 104 is to be determined based on the type of optical receiver 116 and on the particular circuit components utilized in circuit architecture 100. For example, if optical receiver 116 includes an avalanche photodiode then control circuit 104 may set the bias voltage in the range of 20-30V.

In the illustrated embodiment of FIG. 1, processor 106 is coupled to firmware unit 110 to load instructions therefrom. In one embodiment, processor 106 loads programs and data from firmware unit 110 into RAM unit 112 and executes the programs from RAM unit 112. In other embodiments, processor 106 may execute the programs directly from firmware unit 110, without the need of RAM unit 112. RAM unit 112 may include any of dynamic RAM ("DRAM"), synchronous DRAM ("SDRAM"), double data rate SDRAM ("DDR SDRAM"), static RAM ("SRAM"), or the like.

Control circuit 104 may be integrated with one or more components of circuit architecture 100 onto one or more microelectronic dice (e.g., semiconductor, etc.) and incorporated into a receive optical sub-assembly ("ROSA"). For example, processor 106, DAC 108, and firmware unit 110 may all be integrated into a single semiconductor die or wafer.

The illustrated embodiment of receiver circuit 114 includes optical receiver 116 coupled to an amplifier 118. Optical receiver 116 is a device for converting optical energy into electrical energy and may include any photodetector whose current is responsive to the amount of optical energy received by the photodetector. Such detectors may include, but are not limited to, an avalanche photodiode, a photomultiplier tube, a p-n photodiode, a p-i-n photodiode, or the like. Optionally, receiver circuit 114 may include an array of optical receivers 116, coupled in parallel, to broaden the spectral response of receiver circuit 114. In one embodiment, amplifier 118 may include a transimpedance amplifier ("TIA") to convert a current signal generated by optical receiver 116 into a voltage signal.

In one embodiment, receiver circuit 114 includes a temperature monitor (not illustrated) that measures the temperature of optical receiver 116. The temperature measured by the temperature monitor may be fed back to control circuit 104 so that control circuit 104 may adjust the bias voltage responsive to the sensed temperature.

In one embodiment, series resistor 122 is connected in series between bias source 102 and optical receiver 116. Series resistor 122 acts to instantaneously lower the bias voltage across optical receiver 116 during an optical power spike. Series resistor 122 provides instant protection to optical receiver 116 during excessive power conditions by reducing the power dissipated by optical receiver 116.

Bias monitor 120 is coupled to measure a current $I_{TOTAL}$ through optical receiver 116. Current $I_{TOTAL}$ represents the total instantaneous current flowing through optical receiver 116. In one embodiment, bias monitor 120 measures current $I_{TOTAL}$ and generates an equivalent or related current that flows through a ground referenced trans-impedance resistor $R_Z$ (not illustrated in FIG. 1). The voltage generated across $R_Z$, herein referred to as an input voltage $V_I$, is substantially proportional to current $I_{TOTAL}$.

Comparator 124 is coupled to compare input voltage $V_I$, generated by bias monitor 120, with a reference voltage $V_{REF}$. Reference voltage $V_{REF}$ is generated to correspond to a threshold current level. The threshold current level represents a maximum level of current ($I_{TOTAL}$) through optical receiver 116 before circuit architecture 100 is to enter into a shutdown mode. The threshold current level may be dynamically calculated and set, for example by processor 106, or it may be fixed in hardware. Reference voltage $V_{REF}$ may be set by any of a voltage divider, a digital potentiometer, a DAC controlled by processor 106, or the like.

In the illustrated embodiment, comparator 124 is configured to have a first and second state. The state of comparator 124 is indicated by a OVER_CURRENT signal output by comparator 124. The OVER_CURRENT signal indicates whether or not the threshold current level has been exceeded. In one embodiment, comparator 124 is configured to be set to the first state if input voltage $V_I$ is less than reference voltage $V_{REF}$. In addition, comparator 124 is configured to be set to the second state if the input voltage $V_I$ is greater than reference voltage $V_{REF}$.

Reset timer 126 is coupled between bias source 102 and comparator 124. In one embodiment, reset timer 126 is for disabling bias source 102 in response to an optical power spike. In one embodiment, reset timer 126 is further for re-enabling the bias-source after a period of time long enough to allow typical power spikes to settle. It is recognized that the period of time may also be short enough to allow bias source 102 to resume relatively quickly once it is re-enabled.

In the illustrated embodiment, reset timer 126 is coupled to receive the OVER_CURRENT signal from comparator 124. Reset timer 126 is configured to generate a SHUTDOWN_FLAG signal in response to the OVER_CURRENT signal indicating an optical power spike. In one embodiment, reset timer 126 includes a delay timer that is configured to trigger in response to the OVER_CURRENT signal indicating that current $I_{TOTAL}$ has dropped back below the threshold current level. Reset timer 126 is further configured to re-enable bias source 102 upon expiration of the delay timer. In one embodiment, the delay timer may be configured to generate an approximately 30 msec time delay in response to the OVER_CURRENT signal indicating that current $I_{TOTAL}$ has dropped below the threshold current level.

Figure 2:
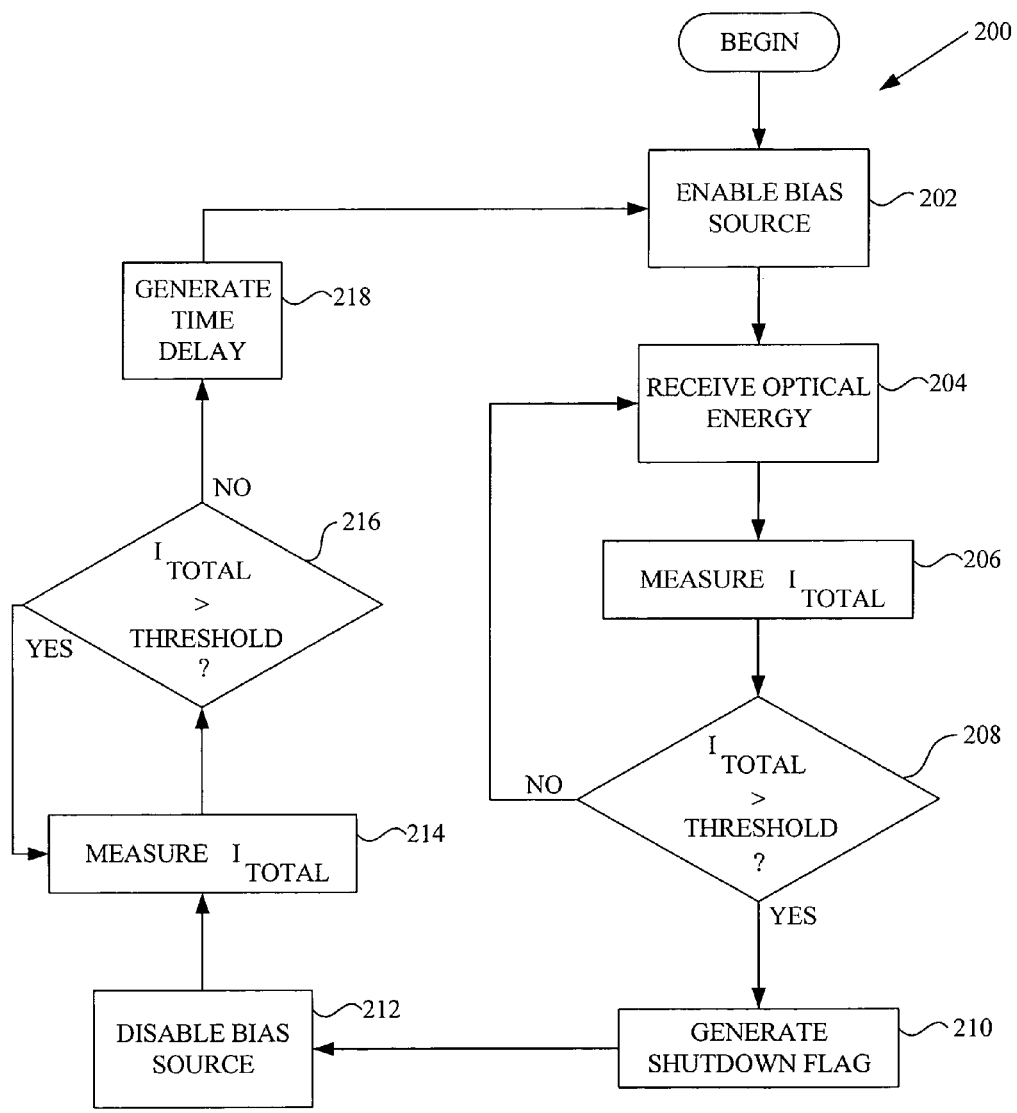
FIG. 2 is a flow chart illustrating a process for protecting an optical receiver by auto-shutdown of a bias voltage, in accordance with an embodiment of the invention.
Figure 3:
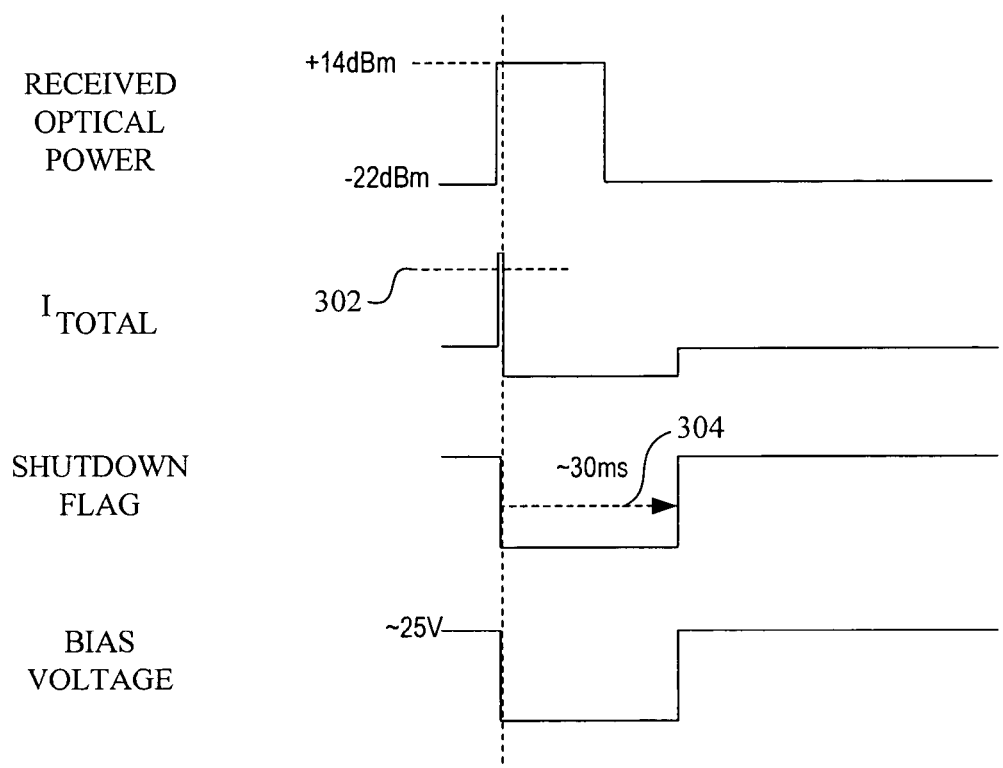
FIG. 3 is a timing diagram illustrating operation of an optical receiver protection circuit with auto-shutdown of a bias voltage, in accordance with an embodiment of the invention.

FIG. 2 is a flow chart illustrating a process 200 executed by circuit architecture 100 to protect optical receiver 116 by auto-shutdown of a bias voltage, in accordance with an embodiment of the invention. FIG. 3 is a timing diagram illustrating operation of circuit architecture 100, in accordance with an embodiment of the invention. Process 200 is described with reference to FIGS. 1, 2, and 3.

In a process block 202, reset timer 126 enables bias source 102. The output of reset timer 126 is shown as the SHUTDOWN FLAG signal in FIG. 3. When enabled, bias source 102 produces a bias voltage across optical receiver 116. The voltage level of the bias voltage is determined by control circuit 104. By way of example, FIG. 3 shows an initial bias voltage of about 25 volts.

In a process block 204, optical receiver 116 receives optical energy, thereby altering the current $I_{TOTAL}$. The current $I_{TOTAL}$ is measured in a process block 206 by bias monitor 120. Bias monitor 120 generates input voltage $V_I$ that is proportional to current $I_{TOTAL}$. In a decision block 208, comparator 124 then compares input voltage $V_I$ to reference voltage $V_{REF}$. If input voltage $V_I$ is less than reference voltage $V_{REF}$, thereby indicating that current $I_{TOTAL}$ is less than threshold current level 302, then comparator 124 is set to its first state indicated by the OVER_CURRENT signal. In the illustrated example of FIG. 3, the initial received optical power is low (about −22 dBm). This low received optical power produces an initial current $I^1 TOTAL$ that is less than threshold current level 302. Since current $I_{TOTAL}$ is less than threshold current level 302 comparator 124 is in its first state and reset timer 126 maintains its output for enabling bias source 102.

In decision block 208, if threshold current level 308 has not been exceeded then process 200 repeats, continuously receiving optical energy, measuring current $I_{TOTAL}$ and comparing current $I_{TOTAL}$ to threshold current level 302.

Should an increase of optical energy received by optical receiver 116 cause threshold current level 302 to be exceeded, circuit architecture 100 is arranged to enter a shutdown mode. The shutdown mode is intended to help protect optical receiver 116 from sustaining damage. In the illustrated example of FIG. 3, the received optical power increases from −22 dBm to +14 dBm. This increase in received optical power causes an increase in the current $I_{TOTAL}$. Series resistor 122 provides instantaneous protection to optical receiver 116 by lowering the bias voltage across optical receiver 116. This instantaneous protection by series resistor 122 gives the remainder of circuit architecture 100 time to respond to the increase in received optical power.

Still referring to the example of FIG. 3, since the increased current $I_{TOTAL}$ now exceeds threshold current level 302, comparator 124 switches to its second state and updates the OVER_CURRENT signal. The updated OVER_CURRENT signal by comparator 124 causes circuit architecture 100 to enter the shutdown mode. In a process block 210, reset timer 126 generates a shutdown flag in response to the OVER_CURRENT signal. In one embodiment, the shutdown flag may be indicated by the output of reset timer 126 switching to a low impedance state. In a process block 212, reset timer 126 disables bias source 102 which causes the bias voltage across optical receiver 116 to be removed. With the bias voltage removed, the current $I_{TOTAL}$ is lowered, thereby reducing the risk of damage to optical receiver 116.

In a process block 214, bias monitor 120 measures current $I_{TOTAL}$ and in a decision block 216, comparator 124 compares the input voltage $V_I$ to reference voltage $V_{REF}$. If the input voltage $V_I$ is greater than the reference voltage $V_{REF}$, thereby indicating that current $I_{TOTAL}$ is still greater than threshold current level 302, process 100 repeats back to process block 214, continuously measuring current $I_{TOTAL}$ and comparing current $I_{TOTAL}$ to threshold current level 302.

Once current $I_{TOTAL}$ has dropped below threshold current level 302, due to removal of the bias voltage, process 200 proceeds to a process block 218 where reset timer 126 generates a time delay 304. Upon expiration of time delay 304, process 200 returns to process block 202, where reset timer 126 re-enables bias source 102, causing the bias voltage to be re-applied to optical receiver 116. By way of example, reset timer 126 may re-enable bias source 102 by setting its output to a high impedance state. If the high power condition persists beyond time delay 304 then current $I_{TOTAL}$ will rapidly increase up to the threshold current level and circuit architecture 100 will enter the shutdown mode again. The illustrated example of FIG. 3 shows time delay 304 as about 30 ms, but it is recognized that any time period that is long enough to allow typical power spikes to settle and short enough to allow bias source 102 to resume relatively quickly may be utilized.

Figure 4:
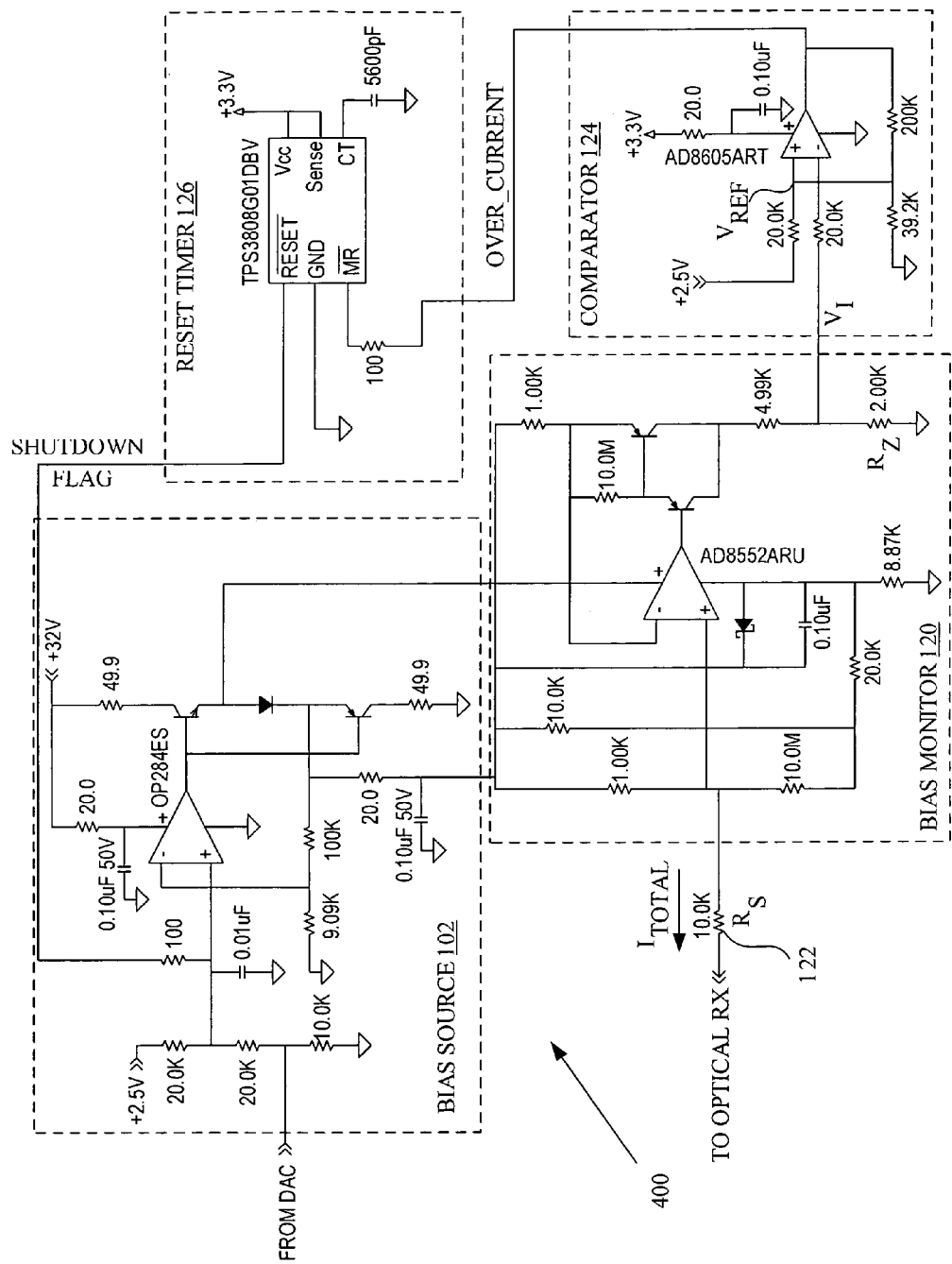
FIG. 4 is a circuit diagram illustrating an optical receiver protection circuit with auto-shutdown of a bias voltage, in accordance with an embodiment of the invention.

FIG. 4 is a circuit diagram illustrating an optical receiver protection circuit 400 with auto-shutdown of a bias voltage, in accordance with an embodiment of the invention. Protection circuit 400 is one example implementation of a portion of circuit architecture 100.

In the illustrated embodiment of FIG. 4, bias source 102 includes a non-inverting amplifier coupled to DAC 108. By way of example, the amplifier of bias source 102 may include an Analog Devices Precision Rail-to-Rail Input & Output Operational Amplifier, part no. OP284. The output of the amplifier is coupled to a voltage follower transistor stage.

The illustrated embodiment, of FIG. 4, shows bias monitor 120 as including a current mirror topology. In one embodiment, bias monitor 120 includes a low error current mirror to generate a current equivalent to current $I_{TOTAL}$. The low error current mirror may include a high precision operational amplifier and two PNP transistors coupled to the output of the operational amplifier. By way of example, the current mirror of bias monitor 120 may include an Analog Devices Zero-Drift, Single-Supply, Rail-to-Rail Input/Output Operational Amplifier, part no. AD8552. Bias monitor 120 also includes trans-impedance resistor $R_Z$. As mentioned above, the mirrored current flows through $R_Z$ creating input voltage $V_I$, which is proportional to current $I_{TOTAL}$.

The illustrated embodiment, of FIG. 4, also shows comparator 124 as including an amplifier, configured as a hard-limited comparator. By way of example, the amplifier may include an Analog Devices Precision Low Noise CMOS Rail-to-Rail Input/Output Operational Amplifier, part no. AD8605.

The illustrated embodiment, of FIG. 4, shows the output of reset timer 126 coupled to the input of the amplifier of bias source 102. In one embodiment, reset timer 126 includes an open drain field effect transistor ("FET") output. By way of example, reset timer 126 includes a Texas Instruments Low Quiescent Current, Programmable-Delay Supervisory Circuit, part no. TPS3808. During normal operation the output of reset timer 126 is configured to operate in a high impedance state. During shutdown mode, reset timer 126 is configured to set the $\overline{RESET}$ output to a low impedance state coupled to ground, thereby forcing the bias voltage generated by bias source 102 to drop to near zero volts.

Figure 5:
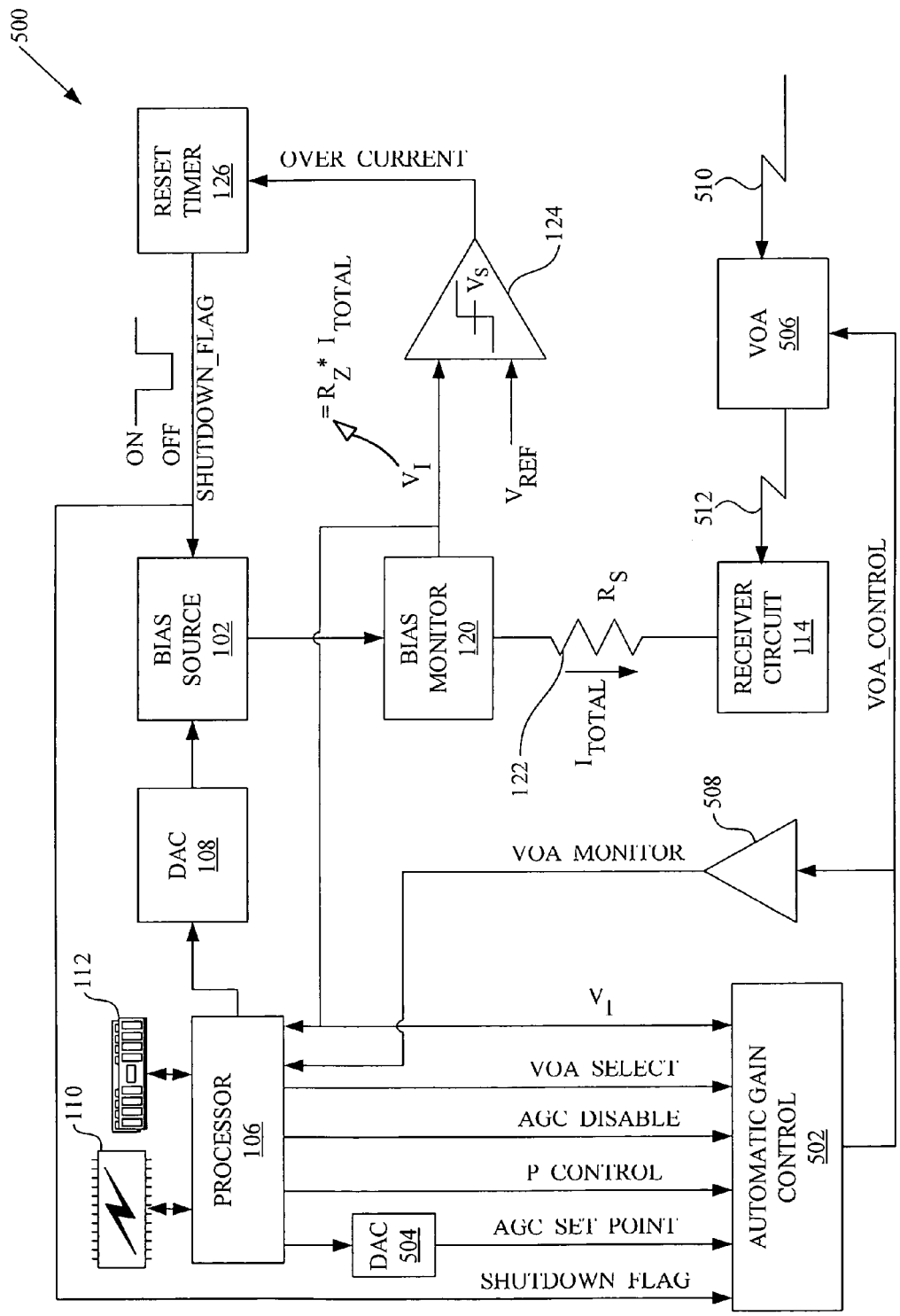
FIG. 5 is a functional block diagram illustrating an optical receiver protection circuit architecture with auto-shutdown of a bias voltage and with auto-control of an optical attenuator, in accordance with an embodiment of the invention.

FIG. 5 is a functional block diagram illustrating an optical receiver protection circuit architecture 500 with auto-shutdown of a bias voltage and with auto-control of an optical attenuator, in accordance with an embodiment of the invention. The illustrated embodiment of circuit architecture 500 includes the circuit components of circuit architecture 100, as shown in FIG. 1, plus additional circuit components including an automatic gain control circuit 502, a DAC 504, a variable optical attenuator ("VOA") 506 and a VOA monitor circuit 508.

VOA 506 is optically coupled to receiver circuit 114 and configured to receive optical energy 510, attenuate the optical energy and output the attenuated optical energy 512 to optical receiver 116 of receiver circuit 114. VOA 506 and supporting circuitry extend the operating power range of optical receiver 116 to allow operation during conditions of high received optical power. VOA 506 and supporting circuitry also provide additional protection for optical receiver 116 by increasing the optical attenuation of received optical energy 512 in response to an optical power spike.

Automatic gain control ("AGC") 502 is coupled to the output of bias monitor 120 to receive input voltage $V_I$, which as mentioned above, is substantially proportional to current $I_{TOTAL}$. AGC 502 is also coupled to VOA 506 to control the level of optical attenuation by VOA 506. In one embodiment, AGC 502 is configured to generate a VOA_CONTROL signal based on $V_I$, where the VOA_CONTROL signal sets the optical attenuation of VOA 506. In one embodiment, VOA_CONTROL signal may include an analog control voltage to set the level of optical attenuation by VOA 506.

In the illustrated embodiment, AGC 502 is further coupled to reset timer 126. In one embodiment, AGC 502 is configured to increase the level of optical attenuation by VOA 506 during the shutdown mode, indicated by the SHUTDOWN_FLAG signal. In one embodiment, AGC 502 is configured to set VOA 506 to a maximum level of attenuation in response to the SHUTDOWN_FLAG signal.

Processor 106 of circuit architecture 500 is configured to provide AGC 502 with an AGC_SET_POINT signal. The AGC_SET_POINT signal represents a nominal operating current level of optical receiver 116, where the nominal operating current level is less than the threshold current level. In one embodiment, AGC 502 monitors input voltage $V_I$ and adjusts the optical attenuation of VOA 506 such that current $I_{TOTAL}$ trends towards the operating current level indicated by the AGC_SET_POINT signal. In one embodiment, AGC 502 sets the optical attenuation of VOA 506 to a minimum attenuation level if the current $I_{TOTAL}$ is less than the operating current level.

VOA monitor 508 is coupled to provide processor 106 with a VOA_MONITOR signal that is representative of the VOA_CONTROL signal generated by AGC 502. VOA monitor 508 provides feedback so that processor 106 may assume direct control of the VOA_CONTROL signal.

In the illustrated embodiment, AGC 502 includes an AGC_DISABLE input and a P_CONTROL input. AGC 502 also includes a disable function that forces AGC 502 to set VOA 506 to a minimum optical attenuation level. AGC 502 is configured to activate the disable function if the AGC_DISABLE input is asserted and the P_CONTROL input is not asserted.

In the illustrated embodiment, AGC 502 also includes an override function that enables processor 106 to take over direct control of the VOA_CONTROL signal. The override function is enabled if both the AGC_DISABLE and P_CONTROL inputs are asserted. In the illustrated embodiment, processor 106 is coupled to the P_CONTROL and AGC_DISABLE inputs. Firmware unit 110 or RAM unit 112 further includes instructions to allow assertion of these inputs and directly control the VOA_CONTROL signal based on, at least one of, the VOA_MONITOR signal and input voltage $V_I$.

The illustrated embodiment of AGC 502 further includes a VOA_SELECT input for selecting different gain paths within AGC 502 for control of different VOA types. In one embodiment, the VOA_SELECT input of AGC 502 is coupled to and controlled by processor 106.

Figure 6:
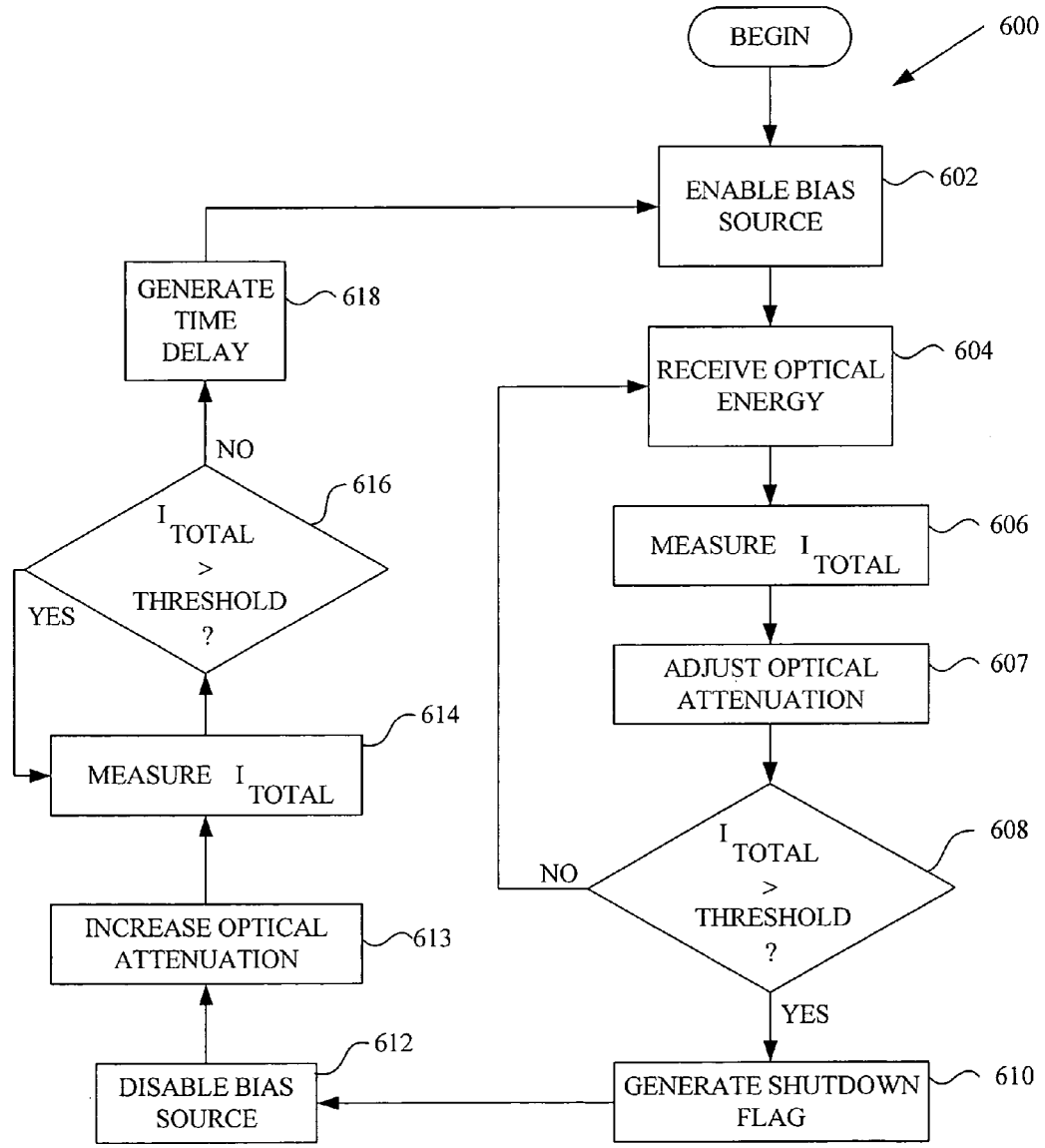
FIG. 6 is a flow chart illustrating a process for protecting an optical receiver by auto-shutdown of a bias voltage and auto-control of an optical attenuator, in accordance with an embodiment of the invention.
Figure 7:
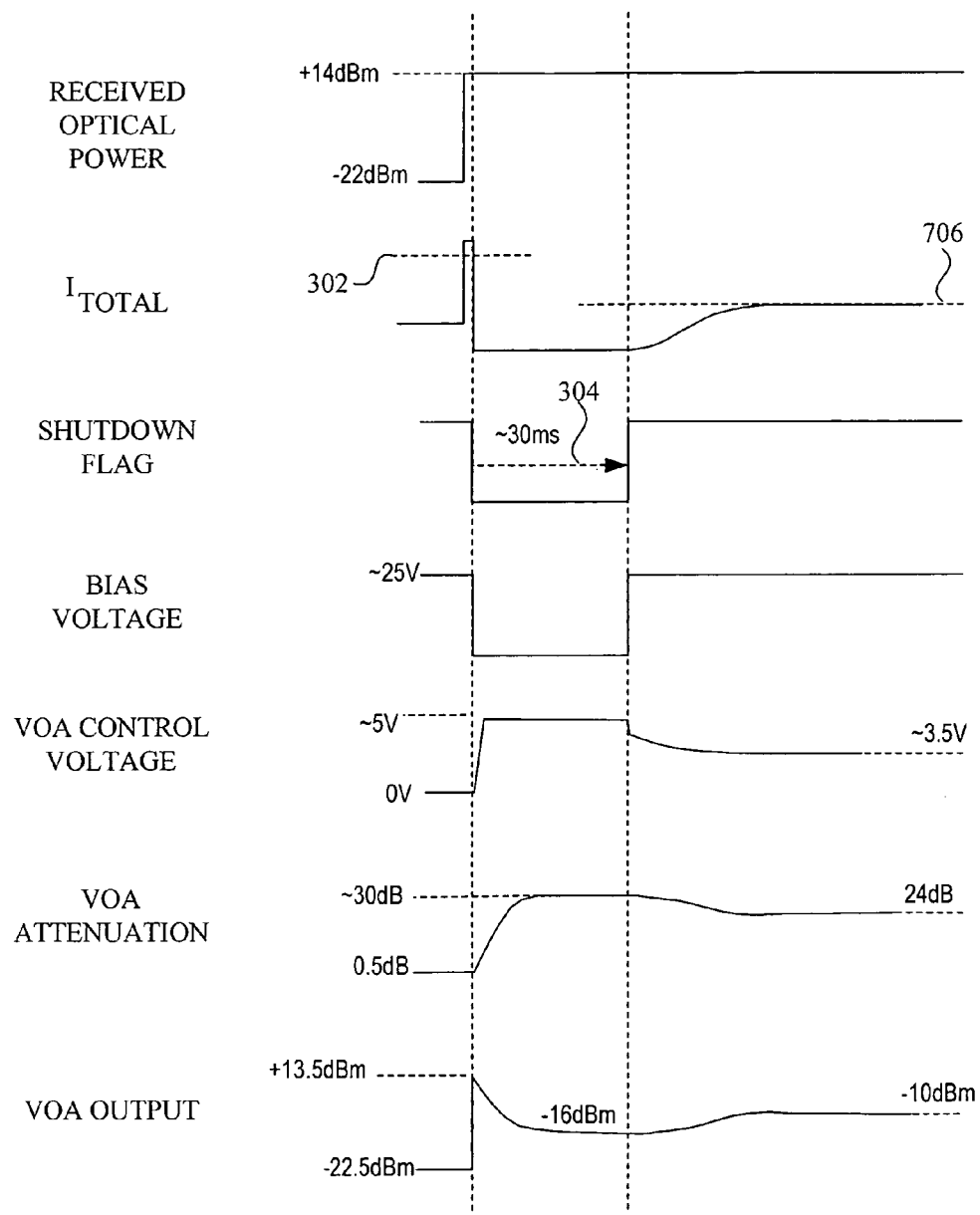
FIG. 7 is a timing diagram illustrating operation of an optical receiver protection circuit with auto-shutdown of a bias voltage and with auto-control of an optical attenuator, in accordance with an embodiment of the invention.

FIG. 6 is a flow chart illustrating a process 600 executed by circuit architecture 500 for protecting optical receiver 116 by auto-shutdown of the bias voltage and auto-control of VOA 506, in accordance with an embodiment of the invention. FIG. 7 is a timing diagram illustrating operation of circuit architecture 500, in accordance with an embodiment of the invention. Process 600 is described with reference to FIGS. 5, 6, and 7.

In a process block 602, reset timer 126 enables bias source 102 thereby producing a bias voltage across optical receiver 116. The output of reset timer 126 is shown as the SHUTDOWN FLAG signal in FIG. 7. By way of example, FIG. 7 shows an initial bias voltage of about 25 volts.

In a process block 604, optical receiver 116 receives optical energy, thereby altering the current $I^1$TOTAL. The current $I_{TOTAL}$ is measured in a process block 606 by bias monitor 120. Bias monitor 120 then generates input voltage $V_I$.

In a process block 607, AGC 502 receives an AGC_SET_POINT signal from processor 106. In one embodiment the AGC_SET_POINT signal may correspond to a nominal operating current level 706 for optical receiver 116. AGC 502 also receives input voltage $V_I$ and generates a VOA_CONTROL signal for controlling the optical attenuation of VOA 506, such that $I_{TOTAL}$ trends towards operating current level 706. In one embodiment, AGC 502 enters a closed-loop mode and adjusts the VOA control voltage, such that $I_{TOTAL}$ trends towards operating current level 706, only if the current $I_{TOTAL}$ is greater than operating current level 706. In that embodiment, AGC 502 is further configured to set VOA 506 to a minimum attenuation level if the current $I_{TOTAL}$ is less than the operating current level 706. In the illustrated embodiment of FIG. 7, the VOA_CONTROL signal is represented by a VOA control voltage. FIG. 7 shows the initial current $I_{TOTAL}$ as less than operating current level 706. Thus, VOA control voltage is set to zero volts, thereby causing VOA 506 to be set to a minimum attenuation of 0.5 dB.

In a decision block 608, comparator 124 compares input voltage $V_I$ to reference voltage $V_{REF}$ and outputs the OVER_CURRENT signal. In the illustrated example of FIG. 7, the initial received optical power is low (about −22 dBm). This low received optical power produces an initial current $I_{TOTAL}$ that is less than threshold current level 302. Since current $I_{TOTAL}$ is less than threshold current level 302 comparator 124 is in its first state and reset timer 126 maintains its output for enabling bias source 102.

In decision block 608, if threshold current level 308 has not been exceeded then process 600 repeats, continuously receiving optical energy, measuring current $I_{TOTAL}$ and comparing current $I_{TOTAL}$ to threshold current level 302.

In the event of an increase of optical energy received by optical receiver 116, circuit architecture 500 is arranged to enter a shutdown mode should the threshold current level 302 be exceeded. The shutdown mode is intended to help protect optical receiver 116 from sustaining damage. In the illustrated example of FIG. 7, the received optical power increases from −22 dBm to +14 dBm. This increase in received optical power causes an increase in the current $I_{TOTAL}$. Since the increased current $I^{TOTAL}$ now exceeds threshold current level 302, comparator 124 switches to its second state and updates the OVER_CURRENT signal. The updated OVER_CURRENT signal output by comparator 124 causes circuit architecture 500 to enter the shutdown mode.

In a process block 610, reset timer 126 generates a shutdown flag in response to the OVER_CURRENT signal. In a process block 612, reset timer 126 disables bias source 102 which causes the bias voltage across optical receiver 116 to be removed. With the bias voltage removed, current $I_{TOTAL}$ is lowered, thereby reducing the risk of damage to optical receiver 116.

In a process block 613, AGC 502 is coupled to receive the SHUTDOWN_FLAG signal. If a shutdown mode is initiated, AGC 502 switches to an open-loop mode that increases the optical attenuation by VOA 506. In the illustrated example of FIG. 7, the VOA control voltage is increased to about 5V. This control voltage of 5V eventually leads to a VOA attenuation of around 30 dB. With a VOA attenuation of 30 dB the output of VOA 506 decreases from about 13.5 dBm to about −16 dBm. This reduction in optical energy at optical receiver 116 provides additional protection for optical receiver 116. It is recognized that, in response to a shutdown mode by circuit architecture 500, the disabling of the bias voltage and the increasing of optical attenuation may occur in any order or may occur simultaneously. Additionally, other attenuation levels and control voltages may be implemented.

In a process block 614, bias monitor 120 measures current $I_{TOTAL}$ and in a decision block 616, comparator 124 compares input voltage $V_I$ to reference voltage $V_{REF}$. Process block 614 and decision block 616 continuously measure current $I_{TOTAL}$ comparing it to threshold current level 302 until current $I_{TOTAL}$ no longer exceeds threshold current level 302.

Once current $I_{TOTAL}$ has dropped below threshold current level 302, due to removal of the bias voltage, process 600 proceeds to a process block 618 where reset timer 126 generates a time delay 304. Upon expiration of time delay 304, process 600 returns to process block 602, where reset timer 126 re-enables bias source 102, causing the bias voltage to be re-applied to optical receiver 116.

The shutdown mode now having been completed, AGC 502 switches to a closed-loop mode, initially setting the optical attenuation of VOA 506 to a relatively high level. By way of example, the illustrated embodiment, of FIG. 7, shows the VOA control voltage set to about 5V at the end of time delay 304. In this embodiment, the 5V control voltage corresponds to a VOA attenuation of about 30 dB. In process block 607, AGC 502 adjusts the optical attenuation of VOA 506, such that current $I_{TOTAL}$ trends towards operating current level 706. AGC 502 tracks small-signal changes in input voltage $V_I$ caused by small signal changes in the received optical power, such that current $I_{TOTAL}$ is maintained about the operating current level 706.

Figure 8:
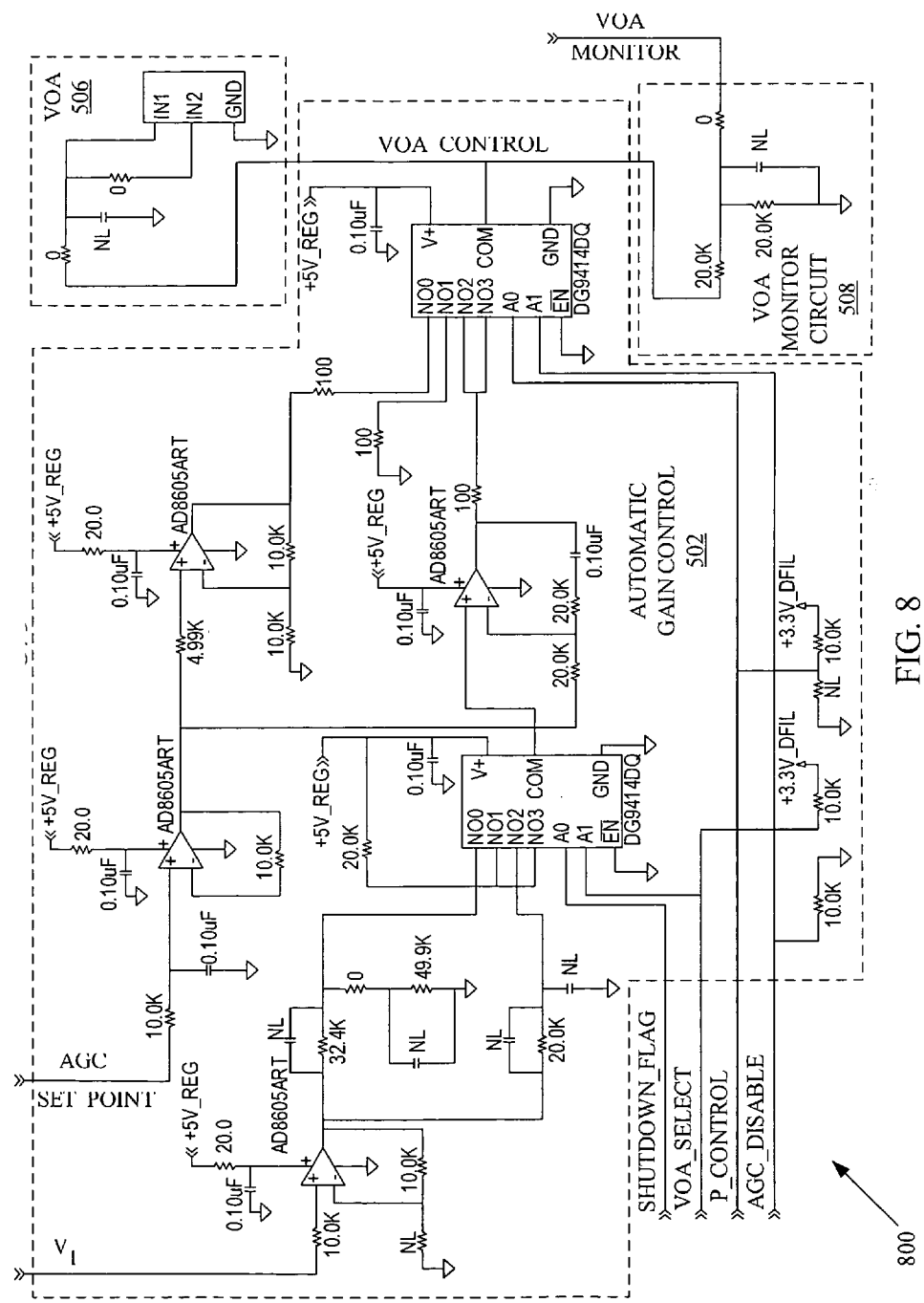
FIG. 8 is a circuit diagram illustrating a portion of an optical receiver protection circuit with auto-shutdown of a bias voltage and with auto-control of an optical attenuator, in accordance with an embodiment of the invention.

FIG. 8 is a circuit diagram 800 illustrating one example implementation of a portion of circuit architecture 500, in accordance with an embodiment of the invention. The illustrated embodiment of circuit diagram 800 includes AGC 502, VOA 506, and VOA monitor circuit 508. AGC 502 includes several amplifiers and multiplexers. By way of example the amplifiers may include Analog Devices Precision Low Noise CMOS Rail-to-Rail Input/Output Operational Amplifiers, part no. AD8605 and the multiplexers may include Vishay Siliconix Single 4×1 Multiplexers, part no. DG9414.

Figure 9:
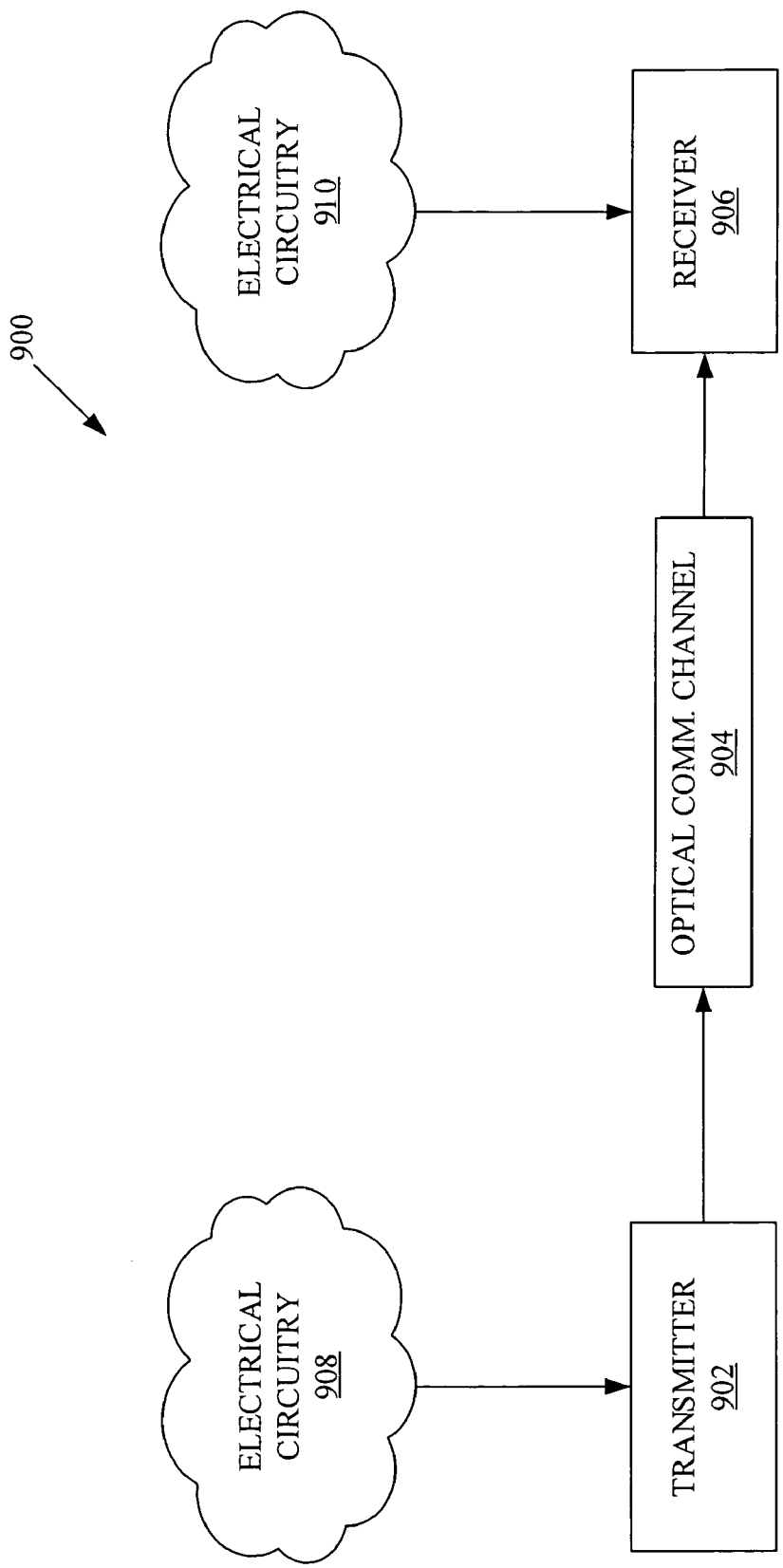
FIG. 9 is a block diagram illustrating a demonstrative communication system implemented with an embodiment of the invention.

FIG. 9 is a block diagram illustrating a demonstrative communication system 900 implemented with an embodiment of the invention. The illustrated embodiment of communications system 900 includes a transmitter 902, an optical communication channel 904, a receiver 906, and electrical circuitry 908 and 910.

In one embodiment, transmitter 902 is for converting an electrical signal from electrical circuitry 908 into an optical signal and transmitting the optical signal on optical communication channel 904. Optical communication channel 904 may include an optic fiber, waveguide, free space, or the like.

Receiver 906 may include circuit architecture 100 or circuit architecture 500 to quickly and reliably protect optical receiver 116 in the event of a high input optical power condition. Receiver 906 is coupled to receive the optical signal from optical communications channel 904 and to convert the optical signal back into an electrical signal. Electrical circuitry 910 may be coupled to the output of amplifier 118 to receive and process the electrical signal.

It is appreciated that both transmitter 902 and receiver 906 need not be unidirectional devices; rather both devices may be transceivers. In transceiver embodiments, both devices may include embodiments of circuit architecture 100 or circuit architecture 500.

The processes 200 and 600 explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   a bias source to provide a bias voltage to an optical receiver;
   a bias monitor to measure a current through the optical receiver;
   a comparator coupled to the bias monitor, the comparator having a first state if the current is less than a threshold current level and the comparator having a second state if the current is greater than the threshold current level, the bias source coupled to be enabled responsive to the first state and disabled responsive to the second state; and
   a reset circuit coupled between the comparator and the bias source, the reset circuit including a delay timer, the delay timer triggered when the comparator switches from the second state back to the first state, wherein the reset circuit is coupled to enable the bias source upon expiration of the delay timer.

2. The apparatus of claim 1, further comprising a variable optical attenuator coupled to increase an optical attenuation of optical receiver in response to a shutdown flag signal generated by the reset circuit.

3. The apparatus of claim 1, further comprising:
   an automatic gain control circuit coupled to the bias monitor to generate a VOA control signal based, at least in part, on the current;
   a variable optical attenuator ("VOA") optically coupled to the optical receiver to adjust an optical attenuation of optical energy to be received by the optical receiver based, at least in part, on the VOA control signal.

4. The apparatus of claim 3, further comprising a processor coupled to provide the automatic gain control circuit with an AGC set point signal, generated based, at least in part, on the current, the AGC set point signal representing a nominal operating current level of the optical receiver, wherein the VOA control signal is to be generated by the automatic gain control circuit based, at least in part, on the AGC set point signal.

5. The apparatus of claim 4, further comprising a VOA monitor circuit coupled to provide the processor with a VOA monitor signal that is representative of the VOA control signal generated by the automatic gain control circuit.

6. The apparatus of claim 5, wherein the automatic gain control circuit comprises an override function that allows the processor to directly adjust the VOA control signal based, at least in part, on the current and the VOA monitor signal.

7. The apparatus of claim 1, further comprising a resistor connected in series between the optical receiver and the bias source, the resistor to lower the bias voltage across the optical receiver during an optical power spike.

8. The apparatus of claim 1, wherein the optical receiver comprises an avalanche photodiode.

9. A method, comprising:
enabling a bias source to apply a bias voltage to an optical receiver, the biased optical receiver having a current;
receiving optical energy at the biased optical receiver, wherein the current is responsive to the received optical energy;
monitoring the current through the optical receiver; and
disabling the bias source if the current is greater than a threshold current level;
generating a time delay after disabling the bias source if the current drops back below the threshold current level; and
re-enabling the bias source after the time delay.

10. The method of claim 9, further comprising re-enabling the bias source if the current drops below the threshold current level.

11. The method of claim 9, further comprising lowering the bias voltage across the optical receiver in response to an optical power spike with a resistor coupled in series with the optical receiver.

12. The method of claim 9, further comprising adjusting an optical attenuation of the received optical energy so that the current trends toward an operating current level.

13. The method of claim 12, wherein adjusting the optical attenuation of the received optical energy comprises adjusting a control voltage of a variable optical attenuator optically coupled to the optical receiver based, at least in part, on the current.

14. The method of claim 9, further comprising:
generating a shutdown flag signal if the current is greater than a threshold current level; and
increasing an optical attenuation of the received optical energy in response to the shutdown flag signal.

15. The method of claim 9, further comprising:
generating an input voltage based, at least in part, on the current;
generating a reference voltage corresponding to the threshold current level;
comparing the input voltage with the reference voltage; and
disabling the bias source if the input voltage is greater than the reference voltage.

16. A system, comprising:
a bias source to provide a bias voltage to an optical receiver;
a bias monitor to measure a current through the optical receiver;
a comparator coupled to the bias monitor, the comparator having a first state if the current is less than a threshold current level and the comparator having a second state if the current is greater than the threshold current level, wherein the bias source is coupled to be enabled responsive to the first state and disabled responsive to the second state;
a reset circuit coupled between the comparator and the bias source, the reset circuit including a delay timer, the delay timer triggered when the comparator switches from the second state to the first state, wherein the reset circuit is further coupled to enable the bias source upon expiration of the delay timer;
a processor coupled to the bias source to control the bias voltage; and
synchronous dynamic random access memory ("SDRAM") coupled to the processor to execute instruction therefrom.

17. The system of claim 16, further comprising:
an automatic gain control circuit coupled to the bias monitor to generate a VOA control signal based, at least in part, on the current;
a variable optical attenuator ("VOA") optically coupled to the optical receiver to adjust an optical attenuation of optical energy to be received by the optical receiver based, at least in part, on the VOA control signal.

* * * * *